(12) United States Patent
Vogel

(10) Patent No.: US 7,970,945 B1
(45) Date of Patent: Jun. 28, 2011

(54) METHOD AND APPARATUS FOR AUTOMATIC PEER-TO-PEER CONTENT COMPARISON

(75) Inventor: Howard S. Vogel, West Cornwall, CT (US)

(73) Assignee: EMC Corporation, Hopkinton, MA (US)

( * ) Notice: Subject to any disclaimer, the term of this patent is extended or adjusted under 35 U.S.C. 154(b) by 944 days.

(21) Appl. No.: 11/130,046

(22) Filed: May 16, 2005

(51) Int. Cl.
*G06F 15/16* (2006.01)
(52) U.S. Cl. .................. 709/248; 715/229; 717/170
(58) Field of Classification Search .............. 715/229; 717/170; 709/248
See application file for complete search history.

(56) References Cited

U.S. PATENT DOCUMENTS

| | | | | |
|---|---|---|---|---|
| 6,976,093 | B2 * | 12/2005 | Lara et al. | 709/248 |
| 7,360,208 | B2 * | 4/2008 | Joshi et al. | 717/168 |
| 7,500,020 | B1 * | 3/2009 | Kabra et al. | 709/248 |
| 7,526,513 | B2 * | 4/2009 | Lees et al. | 1/1 |
| 2005/0086384 | A1 * | 4/2005 | Ernst | 709/248 |

OTHER PUBLICATIONS

Schutt, Thorsten; Schintke, Florian; Reinefeld, Alexander. Efficient Synchronization of Replicated Data in Distributed Systems. 2003. Zuse Institute Berlin. p. 274-283.*
IEEE. "The Authoritative Dictionary of IEEE Standards Terms". Dec. 2000. IEEE. p. 1178.*
Grama et. al. Introduction to Parallel Computing, Second Edition. Publisher: Addison-Wesley. Pub Date: Jan. 16, 2003.*

* cited by examiner

*Primary Examiner* — Andrew Caldwell
*Assistant Examiner* — Bryan Lee
(74) *Attorney, Agent, or Firm* — Krishnendu Gupta; Joseph D'Angelo

(57) ABSTRACT

A method and apparatus for verifying the content contained on components of a distributed network is disclosed. The method comprises the steps of selecting at least one parameter specifying at least one content associated with a first selected component, comparing the at least one content associated with the selected parameter associated with the first selected component to the at least one content associated with the selected parameter associated with a second selected component, and providing an indication when the value of the at least one content associated with the first and second components is not the same. In one aspect of the invention, the method disclosed is further repeated for each component in the system by comparing a prior tested component with a next selected component.

19 Claims, 6 Drawing Sheets

METHOD AND APPARATUS FOR AUTOMATIC PEER-TO-PEER CONTENT COMPARISON

RELATED APPLICATION

This application is related to commonly-owned concurrently filed U.S. patent application Ser. No. 11/130,042, entitled "Method and Apparatus for Automated Time-Based Peer-to Peer Thresholding," issued as U.S. Pat. No. 7,626,939, the contents of which are incorporated by reference herein.

FIELD OF THE INVENTION

This application relates to the field of distributed systems and more specifically with a method and apparatus for determining network component content using based peer-to-peer comparison.

BACKGROUND OF THE INVENTION

The use of computer networks has become an integral part of the way businesses provide goods and services to their customers. One advantage the use of the network provides is to enable the distribution of applications and the business logic that they are comprised of closer to the actual user, or customer. This enables these businesses to offer higher levels of service to disparate groups of customers in a wider geographic area than ever before. This opportunity has also enabled to businesses to allow customers access to the network, albeit limited, for example, to directly track their purchases. In this case, each customer may have access to standardized or "tailored" application software packages or to custom developed software packages, to perform desired operations.

As the networks continue to expand in size and utilization, it becomes important that the network be operating properly. In one aspect, it is critical that information or content among all the components of a network be timely and consistent. For example, in a retail network, it is important that an addition of merchandise or changes to price, color, and quantity of merchandise is reflected on all components of the performed by a mass transmission of all, or updated portions, of the content, to each of the network elements.

However, it is often difficult to determine whether all the network components are properly updated and contain the same information. For example, if during the mass transmission of the updated content, a link or component failure occurs, then the updated content may not be properly received by one or more network components or elements.

Currently, one method to determine whether all the network elements contain the same content, is to compare the content on each network element with a master copy or version of content. This requires that the device, e.g., server, hosting the master version be continuously occupied as the master version is compared individually to the copy on each network element intended to have such information or content.

However, this convention method of comparison is expensive in network bandwidth and time as a master version must be maintained and an "item-by-item" comparison must be made on each network element. Hence, there is a need in the industry for a method and apparatus for determining whether content has been satisfactorily deployed to network elements.

SUMMARY OF THE INVENTION

A method and apparatus for verifying the content contained on components of a distributed network is disclosed. The method comprises the steps of selecting at least one parameter specifying at least one content associated with a first selected component, comparing the at least one content associated with the selected parameter associated with the first selected component to the at least one content associated with the selected parameter associated with a second selected component, and providing an indication when the value of the at least one content associated with the first and second components is not the same. In one aspect of the invention, the method disclosed is further repeated for each component in the system by comparing a prior tested component with a next selected component.

Figure 1:
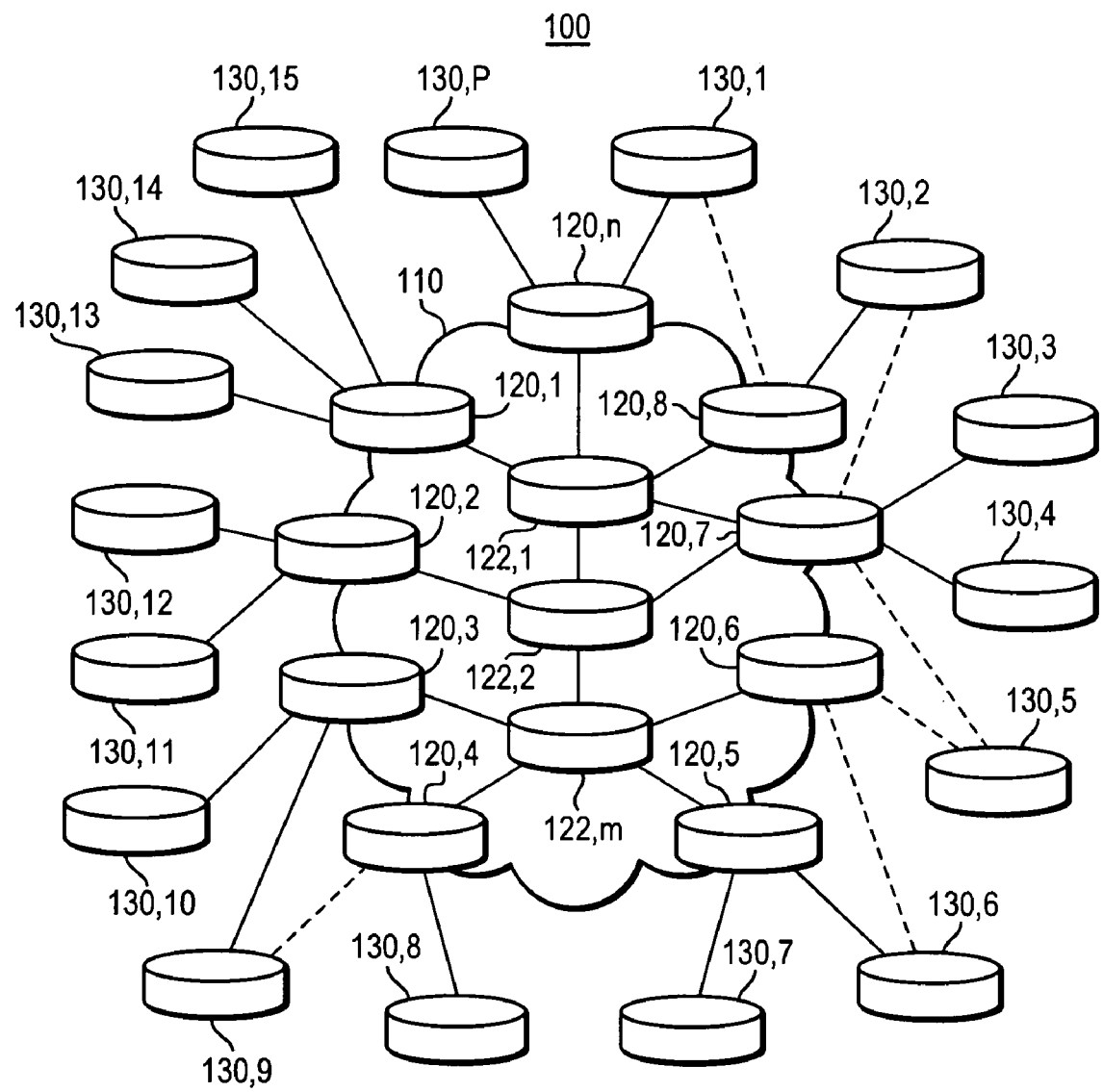
FIG. 1 illustrates a conventional network configuration.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1 illustrates a conventional enterprise network configuration 100 including multi-tier network 110 through which a network owner, e.g., a manufacturer, retailer or provider of services, may construct to enable users to communicate with the network owner. In this illustrated configuration, network 110, which may represent a public network, such as the Internet, that provides a communication linkage between the network owner's edge servers 120.1-120.$n$ and routers 122.1-122.$m$ components or elements. Edge server components 120.1-120.$n$ provide a means for communicating between users, represented as nodes 130.1-130.$p$, and the information or content contained on the network owners internal server or router components. 122.1-122.$m$ Although not shown, it would be recognized that network configuration 100 may further include a plurality of load balancer components or elements to balance the traffic load between the edge routers 120.1-120.$n$ and routers 122.1-122.$m$. Also not shown are data bases that may be in communication, via load balancers or switches, to each of the network owners' routers or server components 122.1-122.$m$. The database components may be used to store information regarding the owner's business and practice. This information may include, for example, inventory, invoices, credit card numbers, sales, transactions, user personal identification, etc Typically, users 130.1-130.$p$ communicate with one or another of the edge servers component 120.1-120.$n$. For example, user 130.1 may access the owner's network 110 via edge server component 120.n, as represented by the solid line, or via edge server component 120.1, represented by the dashed line. The selection of one edge server over another may be determined based on factors such as the communication medium, edge server load, etc. Such factors are known and need not be discussed in detail herein.

Figure 2A:
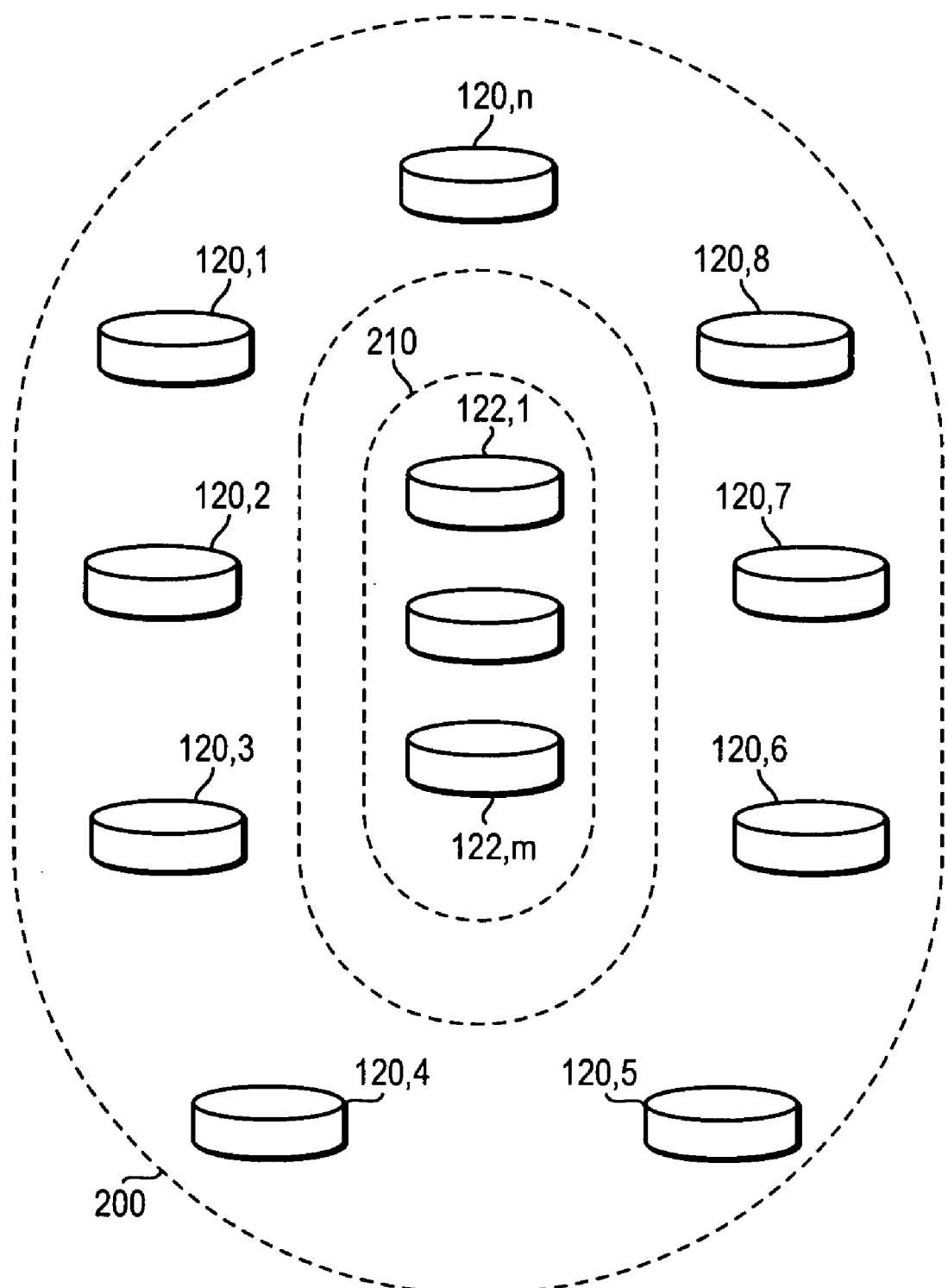
FIG. 2A illustrates an example of a redundancy group in accordance with the principles of the invention.

FIG. 2A illustrates an example of the formation of redundancy groups wherein network components, having substantially the same properties or attributes, are represented as a single entity, in accordance with the principles of the invention's shown, the edge server component shown in FIG. 1 are represented as a single redundancy group 200 as they exhibit substantially the same properties or attributes. Similarly, the router components are represented as a single redundancy group 210 as they exhibit substantially the same properties or attributes. Similar redundancy groups may be formulated for the not shown load balancers and data bases network elements.

Figure 2B:
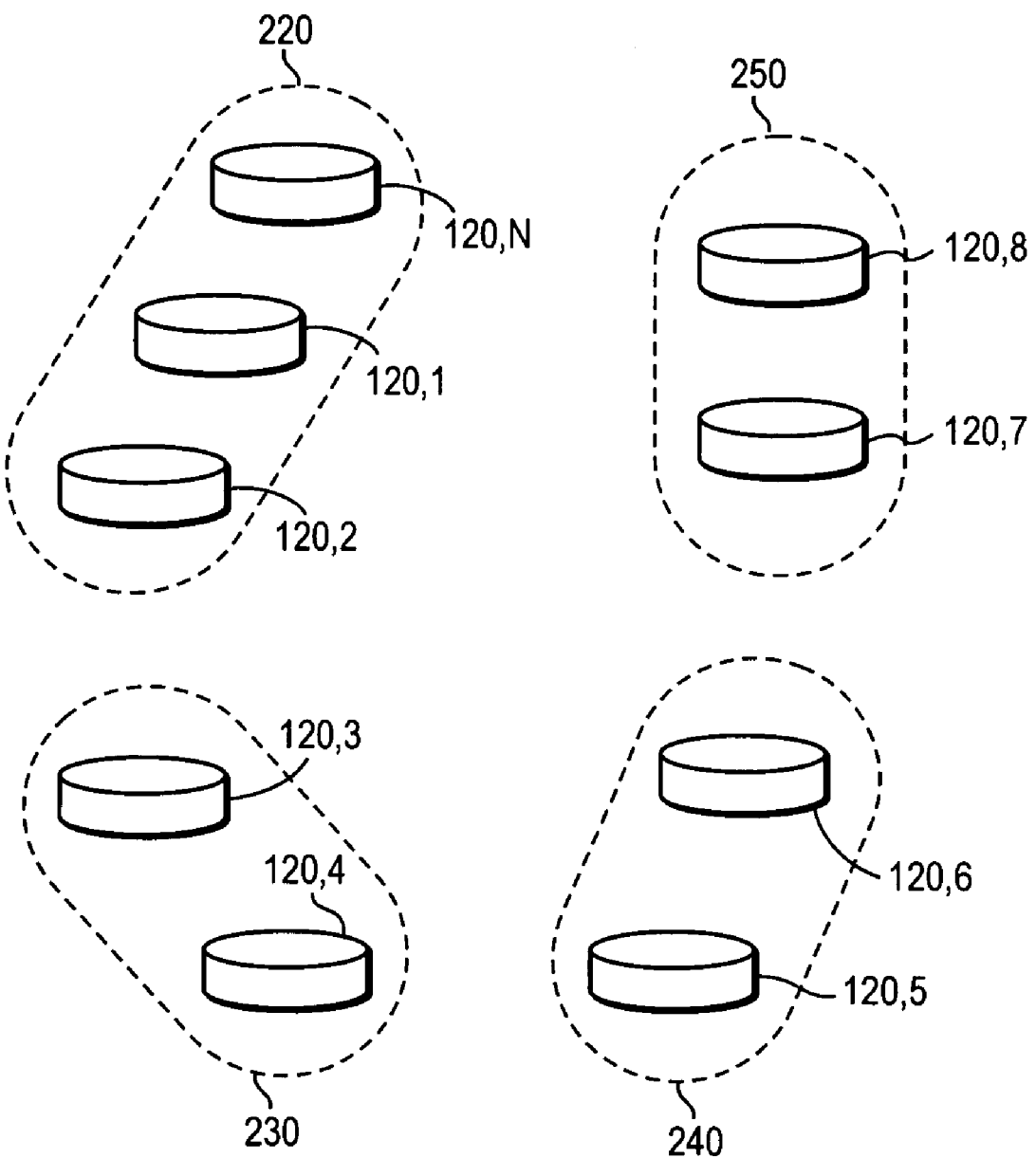
FIG. 2B illustrates a second example of a redundancy group in accordance with the principles of the invention.

FIG. 2B illustrates a second example of the formation of redundancy groups wherein the edge servers, shown in FIG. 1, are assigned to different redundancy group based, for example, on the additional similar property; geographic location. In this case, the location is a selected as a differentiating property that is not exhibited by each of the edge server component. Hence, in this second example, servers 120.3 and 120.4 are assigned to redundancy group 230 whereas servers 120.7 and 120.8 are assigned to redundancy group 250. Additional differentiating properties may be selected from the group consisting of type of equipment, type of communication, level of application residing on the equipment, etc. Each of these factors may be used to create redundancy groups of common properties or attributes.

Figure 3:
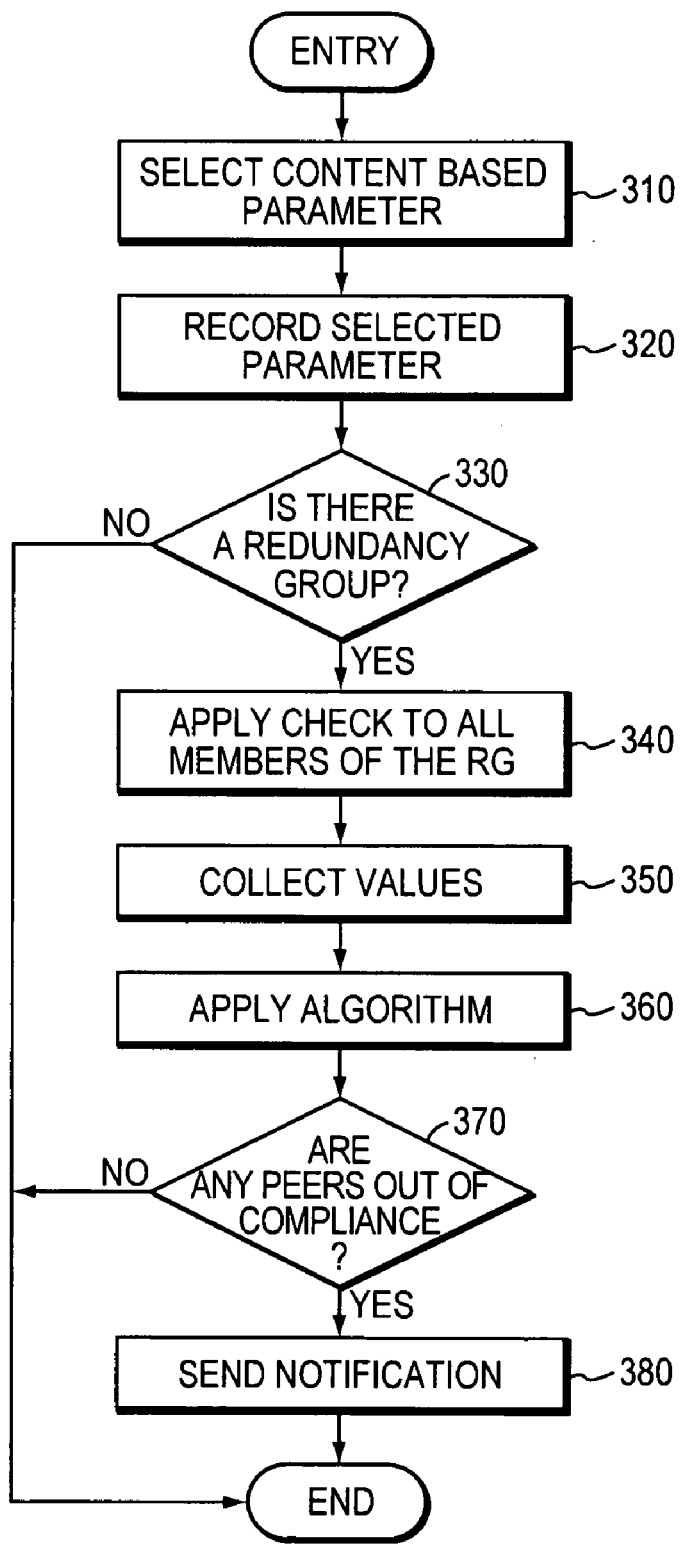
FIG. 3 illustrates an exemplary process for peer-to-peer comparison in accordance with the principles of the invention.

FIG. 3 illustrates an exemplary process for determining whether elements of a redundancy group. In this exemplary process, a type of content-based parameter is selected or identified is defined at block 310. This type of content-based selection may represent all or a designated part of the information expected to be resident within the elements of a redundancy group. For example, the content-based selection may represent a line-by-line comparison of the expected content. In another aspect, the content-based selection may represent a specific image or textual item. For example, if the selected information or content is textual, then a line code, a block code, or a cyclical redundancy code (CRC) may be used to determine whether the stored textual information is as expected. Similar representation of images, e.g., static pictures, audio, video, or a combination of textual, static images and audio/video may also be made.

At block 320, the content associated with the selected type of content is recorded as the master. At block 330, a determination is made whether a redundancy group is available. If the answer is negative, then the exemplary processing shown is ended.

However, if the answer is in the affirmative, then a check is performed on each of the members of a selected redundancy group at block 340. At bock 350, content-based parameter values associated with each member of the redundancy group are collected. At block 360, the collected content-based parameters values are subjected to an algorithm associated with the selected parameter. At block 370, a determination is made whether any elements of the selected redundancy group fail to contain the expected content. If the answer is negative, then the exemplary process is completed.

However, if the answer is in the affirmative, then a notification is provided that at least one of the elements of the redundancy group is fails to contain the expected content and is not consistent with the other members of the redundancy group.

Figure 4:
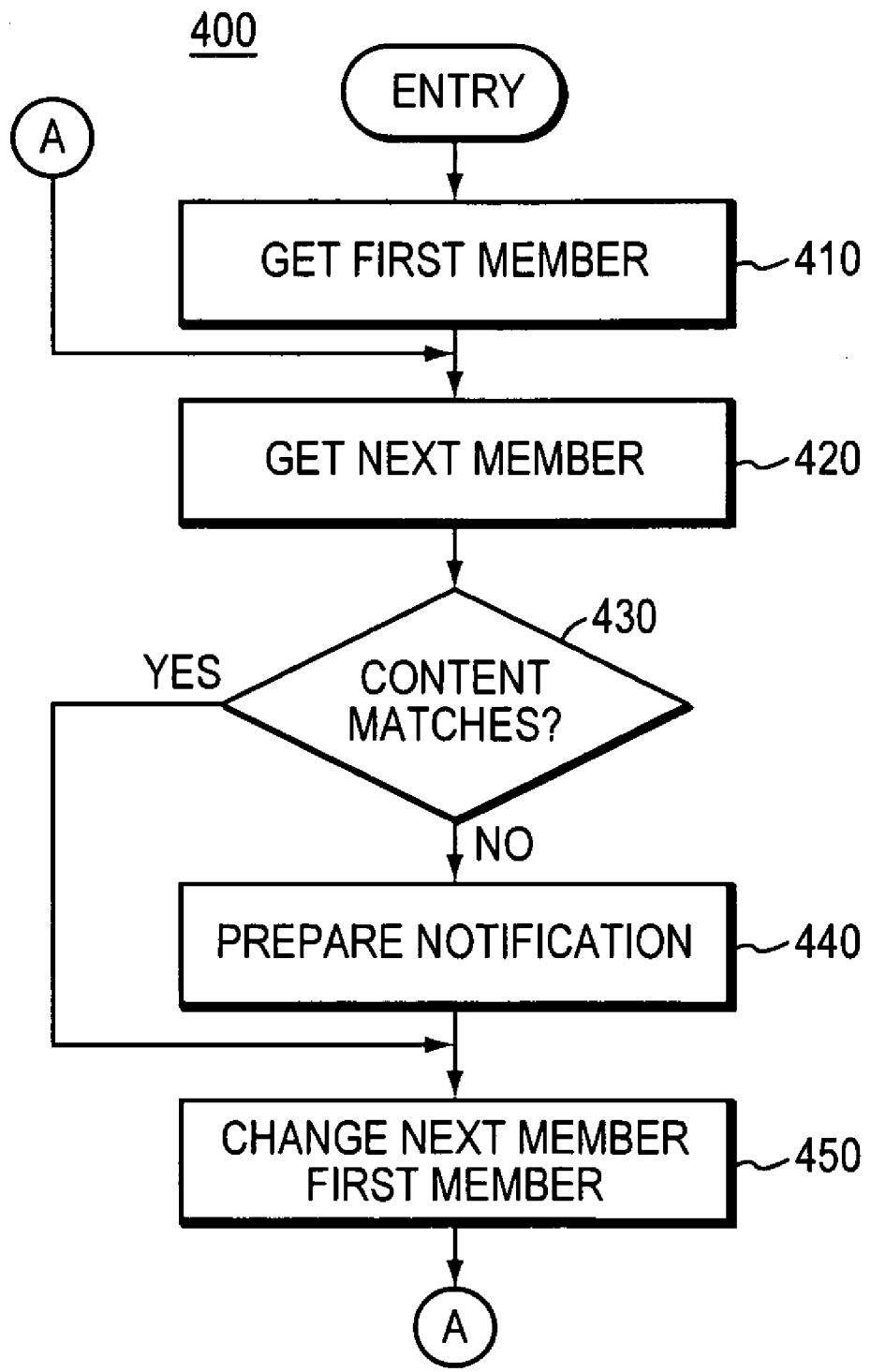
FIG. 4 illustrates an exemplary process for processing peer-to-peer comparisons for the process shown in FIG. 3.

FIG. 4 illustrates an exemplary process 400 for performing content-based peer-to-peer comparison in accordance with the principles of the invention. In this exemplary process, a first member of the redundancy group is selected, at block 410. At block 420, a next/subsequent member of the redundancy group is selected.

At block 430, a determination is made whether the selected content-based parameter of the first selected member is the comparable to a selected content-based parameter in the next/subsequent selected member of the redundancy group.

If the answer is in the negative then a notification is provided at block 440. However, if the answer is in the affirmative, then, at block 460, the selected content-based parameter of the first selected member of the redundancy group is replaced by the content-based parameter of the next/subsequent selected member and processing continues at block 420 to select a next/subsequent member of the redundancy group.

In one aspect of the invention, the comparisons between member of the redundancy group are performed once for each redundancy group member. In another aspect, the comparisons between members of the redundancy group are repeated until no differences in the selected content-based parameter are found among the redundancy group members. In still another aspect, and the one illustrated in FIG. 4, comparisons are continually repeated between the members of the redundancy group.

Figure 5:
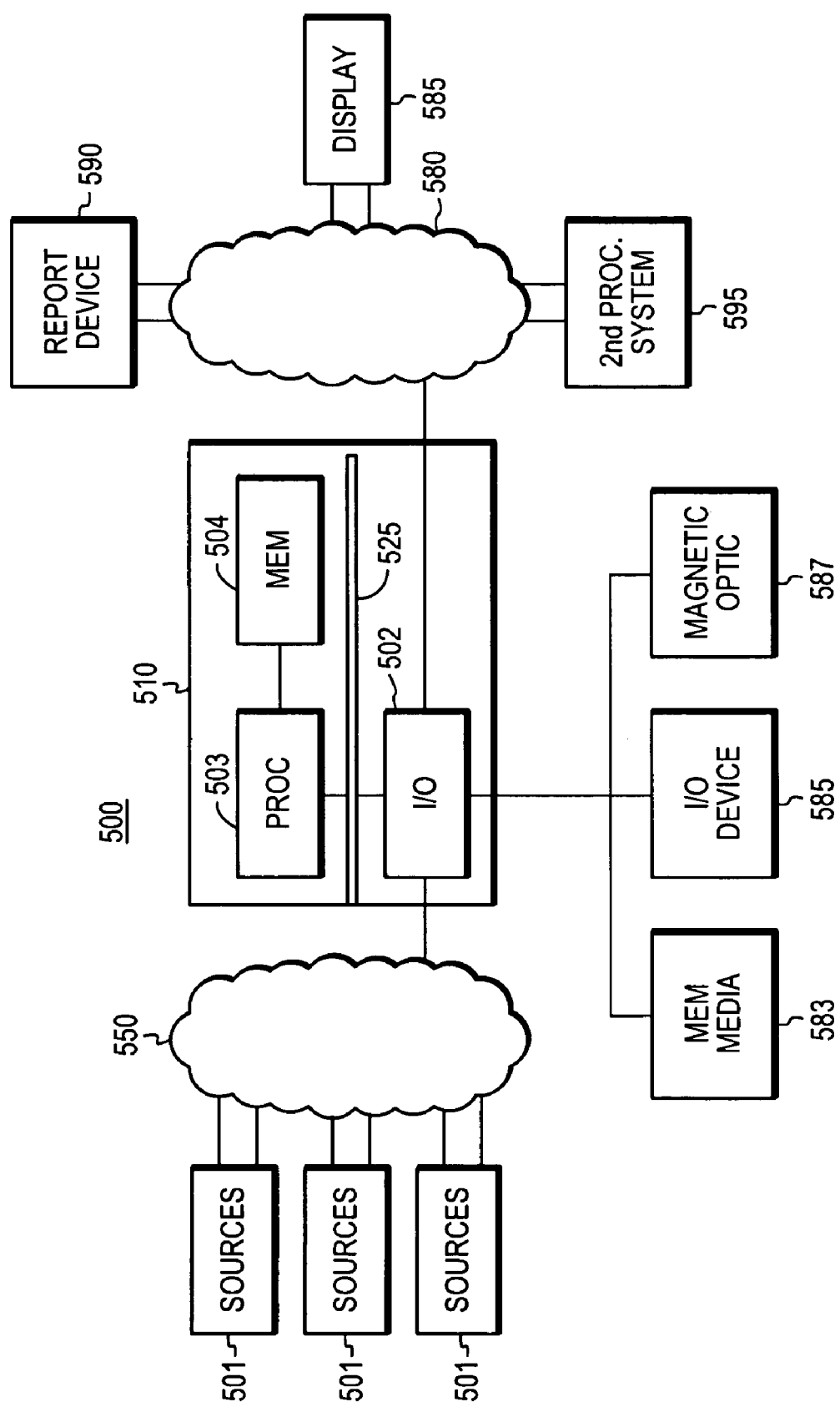
FIG. 5 illustrates an exemplary apparatus for implementing the processing shown herein.

FIG. 5 illustrates an exemplary embodiment of a system 500 that may be used for implementing the principles of the present invention. System 500 may contain one or more input/output devices 502, processors 503 and memories 504. I/O devices 502 may access or receive information from one or more sources or devices 501. Sources or devices 501 may be devices such as routers, servers, computers, notebook computer, PDAs, cells phones or other devices suitable for transmitting and receiving information responsive to the processes shown herein. Devices 501 may have access to device 510 over one or more network connections 550 via, for example, a wireless wide area network, a wireless metropolitan area network, a wireless local area network, a terrestrial broadcast system (Radio, TV), a satellite network, a cell phone or a wireless telephone network, or similar wired networks, such as POTS, Internet, LAN, WAN and/or private networks, e.g., Intranet, as well as portions or combinations of these and other types of networks.

Input/output devices 502, processors 503 and memories 504 may communicate over a communication network 525. Communication network 525 may represent, for example, a bus, a communication network, one or more internal connections of a circuit, circuit card or other apparatus, as well as portions and combinations of these and other communication media. Input data from the client devices 501 is processed in accordance with one or more programs that may be stored in memories 504 and executed by processors 503. Memories 504 may be any magnetic, optical or semiconductor medium that is loadable and retains information either permanently, e.g. PROM, or non-permanently, e.g., RAM. Processors 503 may be any means, such as general purpose or special purpose computing system, such as a laptop computer, desktop computer, a server, handheld computer, or may be a hardware configuration, such as dedicated logic circuit, or integrated circuit. Processors 503 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 504. The code may be read or downloaded from a memory medium 583, an I/O device 585 or magnetic or optical media, such as a floppy disk, a CD-ROM or a DVD, 587 and then stored in memory 504. In addition, the code may be transferred electronically over one or more networks, e.g., 550, 580, I/O device 585, to memory 504. The code may be either computer/processor dependent or computer/processor independent. JAVA is an example of computer/processor independent code. JAVA is a trademark of Sun Microsystems, Inc.

Information from device 501 received by I/O device 502, after processing in accordance with one or more software programs operable to perform the functions illustrated herein, may also be transmitted over network 580 to one or more output devices represented as display 585, reporting device 590 or second processing system 595.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet. In addition, while networks 550 and 580 and communication network 525 are shown as distinct elements it would be recognized that these networks may be the same or different networks and may operate on the same or different communication principles or protocols.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for verifying the content contained on components of a distributed network, each component comprising a plurality of content-based parameters, the method comprising:
    determining if there is a redundancy group by establishing components that have at least one similar property;
    selecting at least one content based parameter of the plurality of content-based parameters, specifying at least one content associated with a first selected component of the redundancy group, wherein the content based parameter represents content resident on the component, wherein the redundancy group comprises a plurality of components of the distributed network and wherein the each component of the redundancy group exhibits multiple content-based parameters common to each component of the redundancy group;
    recording the at least one content based parameter;
    collecting a plurality of values of the at least one content based parameter specifying at least one content from each component of the plurality of components of the redundancy group;
    comparing for equivalence the plurality of values with the at least one content based parameter specifying at least one content wherein the comparing comprises:
        determining for each of the plurality of values a range as a function of the at least one content based parameter and a known tolerance value, wherein the determined range for each value of the plurality of values excludes the value of the at least one content based parameter of the component being determined; and
        determining whether the value of the content based parameter associated with the excluded component is within the determined range;
    and
    providing, based on the determining, an indication when the value of one of the plurality of values of the at least one parameter specifying at least one content associated is not the same.

2. The method as recited in claim 1, further comprising:
    grouping the components of the distributed system based on at least one common attribute.

3. The method as recited in claim 2, wherein the at least one common attribute comprising; a component type, a component manufacturer, a component location, and a component function.

4. An apparatus for verifying the content contained on components of a distributed network, the apparatus comprising:
    a processor in communication with a memory, the processor executing code for:
    determining if there is a redundancy group by establishing components that have at least one similar property;
    selecting at least one content based parameter of the plurality of content-based parameters, specifying at least one content associated with a first selected component of the redundancy group, wherein the content based parameter represents content resident on the component, wherein the redundancy group comprises a plurality of components of the distributed network and wherein the each component of the redundancy group exhibits multiple content-based parameters common to each component of the redundancy group;
    recording the at least one content based parameter;
    collecting a plurality of values of the at least one content based parameter specifying at least one content from each component of the plurality of components of the redundancy group;
    comparing for equivalence the plurality of values with the at least one content based parameter specifying at least one content wherein the comparing comprises:
    determining for each of the plurality of values a range as a function of the at least one content based parameter and a known tolerance value, wherein the determined range for each value of the plurality of values excludes the value of the at least one content based parameter of the component being determined; and determining whether the value of the content based parameter associated with the excluded component is within the determined range; and providing, based on the determining, an indication when the value of one of the plurality of values of the at least one parameter specifying at least one content associated is not the same.

5. The apparatus as recited in claim 4, the processor further executing code for:

grouping the components of the distributed system based on at least one common attribute.

6. The apparatus as recited in claim 5, wherein the at least one common attribute comprising; a component type, a component manufacturer, a component location, and a component function.

7. A medium providing code to a computing system for verifying the content contained on components of a distributed network, the code providing instruction to the computing system for:

a processor in communication with a memory, the processor executing code for:

determining if there is a redundancy group by establishing components that have at least one similar property;

selecting at least one content based parameter of the plurality of content-based parameters, specifying at least one content associated with a first selected component of the redundancy group, wherein the content based parameter represents content resident on the component, wherein the redundancy group comprises a plurality of components of the distributed network and wherein the each component of the redundancy group exhibits multiple content-based parameters common to each component of the redundancy group;

recording the at least one content based parameter;

collecting a plurality of values of the at least one content based parameter specifying at least one content from each component of the plurality of components of the redundancy group;

comparing for equivalence the plurality of values with the at least one content based parameter specifying at least one content wherein the comparing comprises:

determining for each of the plurality of values a range as a function of the at least one content based parameter and a known tolerance value, wherein the determined range for each value of the plurality of values excludes the value of the at least one content based parameter of the component being determined; and determining whether the value of the content based parameter associated with the excluded component is within the determined range;

determining if any content does not contain an expected content; and providing, based on the determining, an indication when the value of one of the plurality of values of the at least one parameter specifying at least one content associated is not the same.

8. The medium as recited in claim 7, where the code further providing instruction to the computing system for:

grouping the components of the distributed system based on at least one common attribute.

9. The medium as recited in claim 8, wherein the at least one common attribute comprising; a component type, a component manufacturer, a component location, and a component function.

10. The method of claim 1 wherein the distributed network comprises a plurality of redundancy groups wherein each of the plurality of redundancy groups comprises a plurality of components of the distributed network; and wherein the steps of selecting, collecting, comparing and providing are performed for each of the plurality of redundancy groups.

11. The method of claim 1 wherein the similar property is selected from the group consisting of equipment, type of communication, level of application residing on each component, geography.

12. The method of claim 1 wherein the similar property is content based.

13. The method of claim 1 wherein algorithm associated with the at least one content based parameter compares a subset of the content based parameter to determine equivalence.

14. The medium of claim 7 wherein the similar property is selected from the group consisting of equipment, type of communication, level of application residing on each component, geography.

15. The medium of claim 7 wherein the similar property is content based.

16. The medium of claim 7 wherein algorithm associated with the at least one content based parameter compares a subset of the content based parameter to determine equivalence.

17. The apparatus of claim 4 wherein the similar property is selected from the group consisting of equipment, type of communication, level of application residing on each component, geography.

18. The apparatus of claim 4 wherein the similar property is content based.

19. The apparatus of claim 4 wherein algorithm associated with the at least one content based parameter compares a subset of the content based parameter to determine equivalence.

* * * * *